(No Model.)
G. W. WEAR.
AIR VENT FOR OIL CANS.
No. 502,334. Patented Aug. 1, 1893.
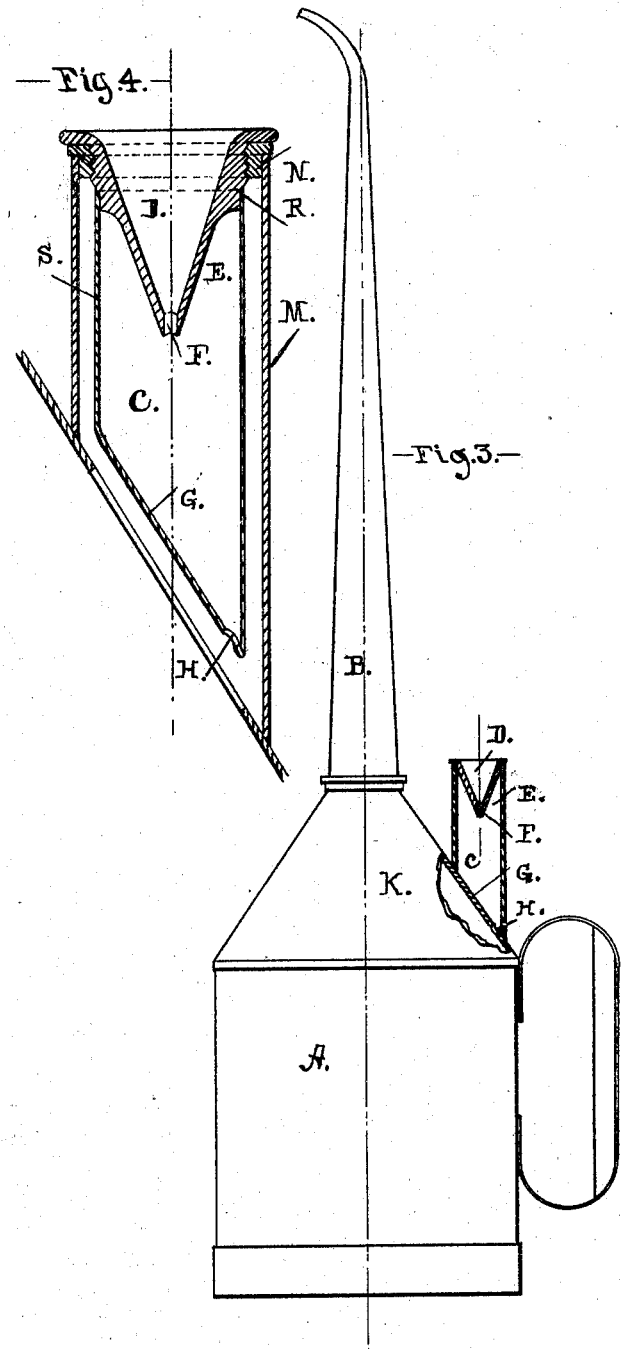
Witnesses.
J. S. Sherman.
R. C. Chapman.
Inventor.
George W. Wear.
By his Attorney
Henry J. Bearup.

UNITED STATES PATENT OFFICE.

GEORGE W. WEAR, OF ELKHART, INDIANA.

AIR-VENT FOR OIL-CANS.

SPECIFICATION forming part of Letters Patent No. 502,334, dated August 1, 1893.

Application filed February 21, 1893. Serial No. 463,513. (No model.)

*To all whom it may concern:*

Be it known that I, GEORGE W. WEAR, a citizen of the United States, residing at Elkhart, in the county of Elkhart and State of Indiana, have invented a new and useful Improvement in Air-Vents for Oil-Cans, Tallow-Pots, Headlight-Oil Reservoirs, Barrels, Casks, or other Vessels, of which the following is a specification.

The object of this invention is to produce an air vent for oil cans, or other vessels that will admit air to the interior of same, for inducing a free flow of fluid, and prevent the fluid from escaping through the air vent, a result which has not been successfully accomplished heretofore. I attain this object by making the top of the air-chamber, in the form of an inverted cone, extending downward into air-chamber to a sufficient distance to form a suitable space above the apex of the conical top, and between the cone and wall of air-chamber for trapping the air, an air-chamber having an inclined or beveled bottom with an air vent perforation therein, also in the apex of conical top, all of which will be fully described hereinafter.

I am aware that air vents consisting of an air chamber having a flat top, with an air opening therein, and a conical bottom having an air opening in conical termination thereof has been used heretofore.

I am not aware that air vents consisting of an air-chamber having its top made in the form of an inverted cone, with an air opening in the apex, and extending downward into the air chamber, and its bottom end inclined, or beveled, has ever before been used.

Referring to the accompanying drawings which form a part of this specification, wherein like letters of reference indicate like parts Figure 1 represents an enlarged sectional view of my air vent in its simplest form of construction. Fig. 2 is a plan view of the same. Fig. 3 represents what is called an engineer's oiler, having a removable spout for filling, having my improved air vent attached, which is also shown in section. Fig. 4 shows my improved air vent in the form of a filling tube and air vent combined to be applied to oil cans and other vessels when desired. I would prefer not to combine them when especially used for oil cans. I can do so however without departing from the principle of my invention.

In the drawings A represents what is known as an engineer's oiler, having a removable spout B for filling the can. I selected this style to show the application of my improved air vent because I prefer to illustrate it in its simplest form and show the principle, and have it readily understood.

C represents an air-chamber made in any suitable form, preferably round as shown, having its length proportionate with its cross-section as shown.

D represents an inverted cone which forms the top of air chamber C, and extending downward into the said air-chamber a sufficient distance to form an air trap of the space E above the apex of cone. The end of cone, or the apex thereof has a small perforation F made therein for the admission of air to the air-chamber C.

The bottom end of the air-chamber C is provided with an inclined or beveled bottom G, having a small perforation H placed at the lowest point in said bottom for the admission of air from air-chamber to interior of can.

When I apply my improved air vent to the style of can shown I prefer to utilize the sloping portion K of can for the bottom G securing the air-chamber directly thereto.

When I make the air vent as a combined air vent and stopper for a filling tube as shown at Fig. 4 the form of construction will be modified from the one shown in the other views.

Referring to the modified form Fig. 4, M represents a filling tube fastened to the sloping portion of can in the usual form. N represents a threaded sleeve secured to filling tube M for the reception of the threaded end R of the hollow stopper S having an air-chamber C, inverted conical top D, perforation F, inclined bottom G' and perforation H. With this style of air vent I cannot utilize the sloping portion of can for the bottom, as shown in the other views, but a separate bottom must be provided, as that portion interior of the filling tube requires cutting out for the admission of fluid to the interior of can.

An air vent constructed as above described makes a very successful device due principally to the application of the inverted cone placed at the top of an air-chamber and extending downward therein, forming the air trap of the space above the apex of cone, and an air chamber having an inclined or beveled bottom, with air vent perforations in the apex of the cone, and at the lowest point at bottom.

By placing the aperture in the lowest part of the inclined bottom it is seldom closed by the contents of the can, as in ordinary use the can is held with its spout only slightly below a horizontal position which would not bring the fluid on a level with said aperture.

Having described my invention, what I claim as new, and desire to secure by Letters Patent, is—

In an oil can the combination with an air chamber of an inverted cone forming the top thereof and provided with an air vent at its apex and an inclined bottom to said chamber provided with an aperture at its lowest side to admit of the can being tipped sufficiently for use, without its contents closing said aperture substantially as set forth.

In testimony whereof I have hereunto set my hand this 16th day of February, 1893.

GEORGE W. WEAR.

Witnesses:
JOHN M. MOUSCHEIN,
ETHAN L. ARNOLD.